US008970504B2

(12) United States Patent
Huang et al.

(10) Patent No.: US 8,970,504 B2
(45) Date of Patent: Mar. 3, 2015

(54) RELIABILITY METAL TRACES

(75) Inventors: Lili Huang, San Jose, CA (US); John Z. Zhong, Cupertino, CA (US); Steve Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1142 days.

(21) Appl. No.: 12/110,117

(22) Filed: Apr. 25, 2008

(65) Prior Publication Data
US 2009/0266621 A1 Oct. 29, 2009

(51) Int. Cl.
G06F 3/041 (2006.01)
G06F 3/044 (2006.01)

(52) U.S. Cl.
CPC ....................................... *G06F 3/044* (2013.01)
USPC ......................................................... 345/173

(58) Field of Classification Search
USPC ..................... 345/173–178; 216/13
See application file for complete search history.

(56) References Cited

U.S. PATENT DOCUMENTS

| | | | |
|---|---|---|---|
| 4,910,168 A * | 3/1990 | Tsai ............................... | 438/586 |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,184,477 B1 | 2/2001 | Tanahashi | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,373,111 B1 * | 4/2002 | Zheng et al. ................... | 257/407 |
| 6,515,358 B1 * | 2/2003 | Dass et al. ..................... | 257/684 |
| 6,690,387 B2 | 2/2004 | Zimmerman et al. | |
| 6,921,469 B2 * | 7/2005 | Larsen ...................... | 204/290.12 |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 2006/0026521 A1 | 2/2006 | Hotelling et al. | |
| 2006/0094241 A1 * | 5/2006 | Park et al. ..................... | 438/689 |
| 2006/0097991 A1 | 5/2006 | Hotelling et al. | |
| 2006/0189123 A1 * | 8/2006 | Saitou et al. .................. | 438/622 |
| 2006/0197753 A1 | 9/2006 | Hotelling | |
| 2007/0269988 A1 * | 11/2007 | Chi et al. ....................... | 438/706 |

(Continued)

FOREIGN PATENT DOCUMENTS

JP 2000-163031 A 6/2000
JP 2002-342033 A 11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Christopher E Leiby
(74) *Attorney, Agent, or Firm* — Morrison & Foerster LLP

(57) ABSTRACT

The formation of improved reliability conductive traces in touch sensor panels that are less prone to failures due to environmental effects is disclosed. Conductive traces, which can be formed from a stackup of metal layers or a single metal layer, can be protected with an additional photoimageable passivation layer of a material such as an organic polymer. This photoimageable coating can be patterned so that it does not appear in the visible area of the touch sensor panel, with much finer tolerances than conventional passivation layers to help keep product dimensions to a minimum.

21 Claims, 7 Drawing Sheets

(56) References Cited

U.S. PATENT DOCUMENTS

2009/0027371 A1* 1/2009 Lin et al. ................ 345/207
2009/0303189 A1* 12/2009 Grunthaner et al. .......... 345/173

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

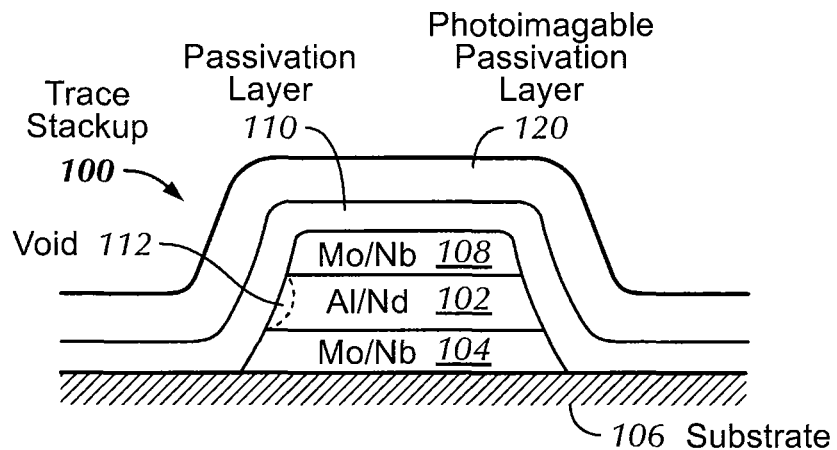
FIG. 1A
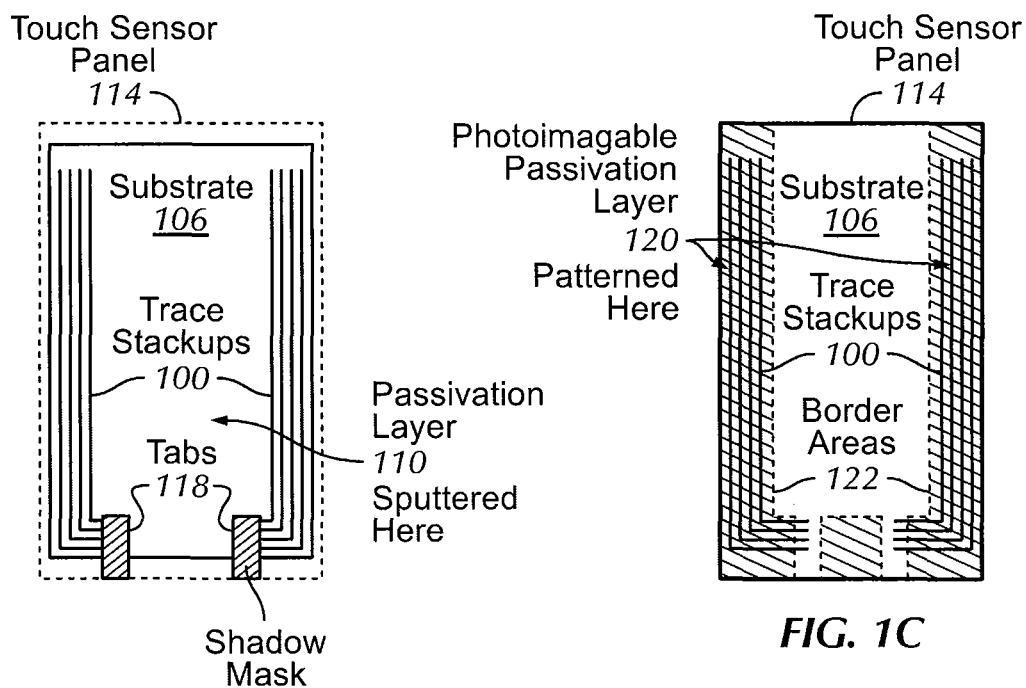
FIG. 1B
FIG. 1C

RELIABILITY METAL TRACES

FIELD OF THE INVENTION

This relates generally to the formation of metal traces on substrates, and more particularly, to the formation of improved reliability conductive traces on touch sensor panels that are less prone to failures due to environmental effects.

BACKGROUND OF THE INVENTION

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material such as Indium Tim Oxide (ITO), often arranged in rows and columns in horizontal and vertical directions on a substantially transparent substrate. In some touch sensor panel designs, the substantially transparent drive lines can be routed to one edge of the substrate for off-board connections using conductive (e.g. metal) traces in the border areas of the substrate where transparency is not required. These conductive traces can be formed by depositing or otherwise forming layers of conductive material on the substrate. The conductive traces can then be protected by passivation layers. Passivation layers are often inorganic compositions (e.g. silicon dioxide ($SiO_2$) or silicon nitride (SiNx)) formed over conductive material such as ITO and other layers to protect those materials from corrosion and other environmental effects. These inorganic compositions are typically formed from simple, small molecules and can be applied using techniques such as sputtering. However, even with the addition of a passivation layer, there are reliability issues involved in the fabrication of these conductive traces.

SUMMARY OF THE INVENTION

This relates to the formation of improved reliability conductive traces in touch sensor panels that are less prone to failures due to environmental effects. Conductive traces, which can be formed from a stackup of metal layers or a single metal layer, can be protected with an additional photoimageable passivation layer of a material such as an organic polymer. This photoimageable coating can be patterned so that it does not appear in the visible area of the touch sensor panel, with much finer tolerances than conventional passivation layers to help keep product dimensions to a minimum.

In some embodiments, the primary conductive trace used for carrying the signal of interest can be a layer of Aluminum Neodymium (Al/Nd). Because Al/Nd does not adhere well to the substrate, a layer of Molybdenum Niobium (Mo/Nb), another metal, can be first formed on the substrate to enhance the adhesion of the Al/Nd to the substrate, although other materials with similar properties can also be used. The Al/Nd layer can then be formed over Mo/Nb layer. A second layer of Mo/Nb (or other similar material) can then be formed over the Al/Nd layer as an additional measure of protection from the atmosphere for the Al/Nd, which is highly corrosive. A first passivation layer of a material that can be sputtered (e.g. $SiO_2$) can then be applied over the traces to protect the formed traces, although other materials with similar properties can also be used.

After the first passivation layer has been applied over the conductive trace layer stackup, a photoimageable passivation layer (e.g. organic polymer) can be applied to further protect the stackup from being corroded by moisture, temperature, or foreign materials and otherwise block chemical penetration. The organic polymer layer can be applied in liquid form (spin-coating or slit-coating), which can be advantageous for filling in voids as compared to inorganic compositions applied using thin film deposition (e.g. sputtering) because of its superior conforming properties. The organic polymer can be a photosensitive material that can be patterned using photolithography. Alternatively, any other photoimageable protective material that provides corrosion and chemical protection can be used.

In other embodiments, the Mo/Nb, Al/Nd and Mo/Nb trilayer stackup is replaced by a single thicker and wider layer of conductive material such as Mo/Nb. The thickness of the Mo/Nb layer can be varied to provide the conductivity required by the particular application. After the Mo/Nb layer is deposited at the preferred thickness, it can be patterned (etched) to form traces. A protective first passivation layer (e.g. $SiO_2$) can then formed over the Mo/Nb layer, and a photoimageable passivation layer of a photoimageable material such as an organic polymer can then be formed over the first passivation layer.

In further embodiments, a single thicker and wider layer of Mo/Nb can be formed on the substrate. After the Mo/Nb layer is deposited at the preferred thickness, it can be patterned (etched) to form traces. A layer of conductive material such as ITO can then be formed over the Mo/Nb layer. To give an extra measure of protection, the Mo/Nb layer can be formed and patterned first, followed by the conductive material layer. The conductive material layer can be patterned to form the drive or sense lines that couple to the metal traces, and can also be patterned over the Mo/Nb traces to form another protective layer for the Mo/Nb traces. A first passivation layer (e.g. $SiO_2$) and a photoimageable passivation layer (e.g. organic polymer) can then be formed over the conductive material layer.

BRIEF DESCRIPTION OF THE DRAWINGS

FIG. 1a illustrates an exemplary improved reliability conductive trace layer stackup formed on a touch sensor panel according to embodiments of the invention.

FIG. 1b illustrates a top view of an exemplary touch sensor panel with conductive trace layer stackups formed on a substrate.

FIG. 1c illustrates a top view of an exemplary touch sensor panel with improved reliability conductive trace layer stackups formed on a substrate according to embodiments of the invention.

DETAILED DESCRIPTION OF THE PREFERRED EMBODIMENTS

Figure 2:
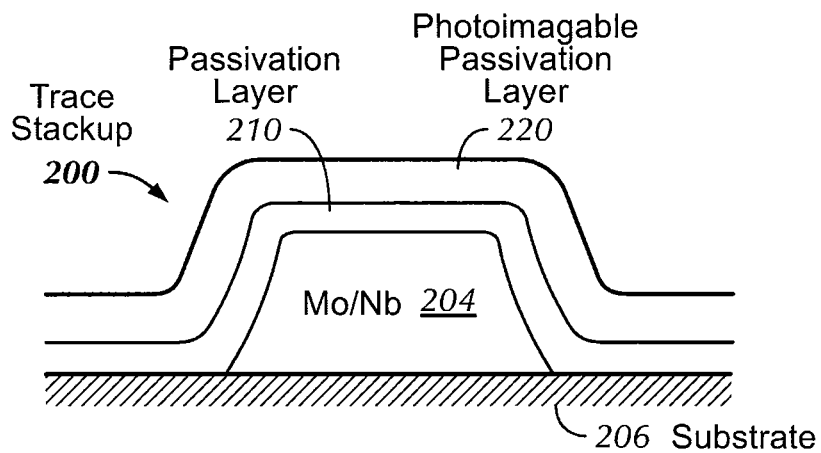
FIG. 2 illustrates another exemplary improved reliability conductive trace layer stackup formed on a touch sensor panel according to embodiments of the invention.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to the formation of improved reliability conductive traces in touch sensor panels that are less prone to failures due to environmental effects. Conductive traces, which can be formed from a stackup of metal layers or a single metal layer, can be protected with an additional photoimageable passivation layer of a material such as an organic polymer. This photoimageable coating can be patterned so that it does not appear in the visible area of the touch sensor panel, with much finer tolerances than conventional passivation layers to help keep product dimensions to a minimum.

Although embodiments of the invention may be described and illustrated herein in terms of mutual capacitance touch sensor panels, it should be understood that embodiments of this invention are not so limited, but are additionally applicable to self-capacitance sensor panels, and both single and multi-touch sensor panels in which the fabrication of conductive traces is required. Furthermore, although embodiments of the invention may be described and illustrated herein in terms of double-sided ITO (DITO) touch sensor panels, it should be understood that embodiments of the invention are also applicable to other touch sensor panel configurations, such as configurations in which the drive and sense lines are formed on different substrates or on the back of a cover glass, and configurations in which the drive and sense lines are formed on the same side of a single substrate.

FIG. 1a illustrates an exemplary improved reliability conductive trace layer stackup 100 formed on a touch sensor panel according to embodiments of the invention. In the example of FIG. 1a, the primary conductive trace used for carrying the signal of interest can be a layer of Aluminum Neodymium (Al/Nd) 102, although other materials with similar properties can also be used. (The signal of interest, as defined herein, includes but is not limited to alternating current (AC) signals, direct current (DC) signals at a substantially constant voltage, and pulse or other momentary perturbations in a DC signal.) Because Al/Nd does not adhere well to substrate 106, a layer of Molybdenum Niobium (Mo/Nb) 104, another metal, can be first formed on substrate 106 to enhance the adhesion of the Al/Nd to the substrate, although other materials with similar properties can also be used. Al/Nd layer 102 can then be formed over Mo/Nb layer 104. A second layer of Mo/Nb 108 (or other similar material) can then be formed over Al/Nd layer 102 as an additional measure of protection from the atmosphere for the Al/Nd, which is highly corrosive. These three layers can be applied in essentially one step as an in-line process, with three chambers used to apply each layer in successive fashion. The three layers can then be etched together to form the traces, although in other embodiments, each of the three layers can be applied and patterned individually before the next layer is applied. First passivation layer 110 of a material that can be sputtered (e.g. $SiO_2$) can then be applied over the traces to protect the formed traces, although other materials with similar properties can also be used.

FIG. 1b illustrates a top view of an exemplary touch sensor panel 114 with conductive trace layer stackups 100 formed on substrate 106 as described above. Shadow masks are used in the sputtering process to form the first passivation layer 110, with tabs 118 protecting the areas of the conductive trace layer stackups to be bonded to a flex circuit. The flex circuit can be conductively bonded to the exposed conductive traces using a conductive adhesive such as anisotropic conductive film (ACF). The ACF can also form an environmental barrier to protect conductive trace layer stackups 100. With a shadow mask, first passivation layer 110 can be sputtered over touch sensor panel 114, conductive trace layer stackups 100, and shadow mask 116. However, because the tolerances involved in forming shadow mask 116 on the panel are on the order of about ±350 microns, slightly smaller tabs may have to be designed, and a smaller FPC opening can be necessary to account for these tolerances.

Referring again to FIG. 1a, because Mo/Nb layers 104 and 108 and Al/Nd layer 102 can be first deposited individually and then etched all at once, it can be difficult to control the wall angles of the resulting traces. In other words, as the unwanted layers of Mo/Nb 104 and 108 and Al/Nd 102 are etched away, the various conductive layers can be etched away at different rates. For example, Al/Nd 102 can be etched away to a greater degree than Mo/Nb 104 and 104, resulting in void 112 in the Al/Nd layer. When first passivation layer 110 is formed over the conductive layer stackup, void 112 may remain (i.e. it may not get filled in by the first passivation layer). If mechanical or chemical stresses or manufacturing flaws cause a crack to form in the brittle $SiO_2$ layer 110, void 112 creates an area of exposure to foreign materials (corrosive agents) for Al/Nd 102, and corrosion and other negative effects can occur to the Al/Nd layer. For example, corrosion of Al/Nd layer 102 due to cracks in first passivation layer 110 can create a larger void 112, which can further remove support for the first passivation layer and can accelerate and increase the cracks in the first passivation layer. Larger cracks can cause further corrosion to Al/Nd layer 102. Thus, the process can feed on itself and eventually create a catastrophic failure in the trace. This can be especially problematic for touch sensor panels, because unlike other applications of conductive thin film layers such as in LCDs where the conductive thin film layers are formed, sandwiched and therefore protected between two glass substrates, the conductive traces on touch sensor panels can be exposed and subject to corrosive environmental agents.

Therefore, according to embodiments of the invention, after first passivation layer 110 has been applied over conductive trace layer stackup 100, a photoimageable passivation layer 120 (e.g. organic polymer) can be applied to further protect the stackup from being corroded by moisture, temperature, or foreign materials and otherwise block chemical penetration. It should be noted that organic polymer is conventionally used for planarization (smoothing of surfaces). However, in embodiments of the invention, organic polymer can be used to form photoimageable passivation layer 120. The organic polymer layer can be applied in liquid form (spin-coating or slit-coating), which can be advantageous for filling in voids as compared to inorganic compositions applied using thin film deposition (e.g. sputtering) because of its superior conforming properties. The organic polymer can be a photosensitive material that can be patterned using photolithography. Alternatively, any other photoimageable protective material that provides corrosion and chemical protection can be used. Typical thicknesses for the materials of stackup 100 can be about 100-700 ångstroms (Å) for Mo/Nb layer 104, about 1500-3000 Å for Al/Nd layer 102, about 300-800 Å for Mo/Nb layer 108, about 300-1000 Å for first passivation layer 110, and about 2.0 microns or greater for photoimageable passivation layer 120.

As mentioned above, one disadvantage of using only a single passivation layer of a sputtered material such as $SiO_2$ is that the tolerances for forming the shadow mask on the touch sensor panel are on the order of about ±350 microns. Accordingly, a smaller FPC opening is necessary to compensate for these tolerances. An additional benefit of applying photoimageable passivation layer 120 of a material such as organic polymer that can be formed using photolithography is that the tolerances of photolithography are on the order of about ±5 microns. Therefore, the panel design need not be made large enough to account for the shadow mask tolerances, and even if the first passivation layer is not precisely applied and does not provide complete coverage due to tolerance errors, the photoimageable passivation layer is present as a backup.

FIG. 1c illustrates a top view of an exemplary touch sensor panel 114 with improved reliability conductive trace layer stackups 100 formed on substrate 106 according to embodiments of the invention. As compared to a liquid crystal display (LCD), which can be placed partially or fully behind touch sensor panel 114 in touch screen embodiments, the touch sensor panel is closer to the user, and therefore the negative visual artifacts from the photoimageable passivation layer can be more pronounced. Accordingly, to minimize these negative visual artifacts, the photoimageable passivation layer can be kept away from the center viewing area, and formed only over the metal traces in the nontransparent border regions using photolithographic techniques. In the example of FIG. 1b, the photoimageable passivation layer can be applied only over conductive trace layer stackups 100 in border areas 122 of the substrate.

FIG. 2 illustrates another exemplary improved reliability conductive trace layer stackup 200 formed on a touch sensor panel according to embodiments of the invention. In the example of FIG. 2, the Mo/Nb, Al/Nd and Mo/Nb tri-layer stackup of FIG. 1a is replaced by a single thicker and wider layer of conductive material such as Mo/Nb 204. In comparing the primary signal-carrying layer in the two embodiments, Mo/Nb layer 204 of FIG. 2 is less reactive and corrodes less easily than the Al/Nd layer of FIG. 1a. The Al/Nd layer of FIG. 1a has better conductivity as compared to Mo/Nb layer 204 of FIG. 2, but the Mo/Nb layer is sufficiently conductive given its larger cross-sectional area, and also adheres well to substrate 206.

The thickness of Mo/Nb layer 204 can be varied to provide the conductivity required by the particular application. After Mo/Nb layer 204 is deposited at the preferred thickness, it can be patterned (etched) to form traces. Note that because only a single conductive layer is formed in the embodiment of FIG. 2, the problem of side wall control is eliminated. A protective first passivation layer 210 (e.g. $SiO_2$) can then formed over Mo/Nb layer 204, and a photoimageable passivation layer 220 of a photoimageable material such as an organic polymer can then be formed over the first passivation layer. Typical thicknesses for the materials of stackup 200 can be about 3000-5000 Å for Mo/Nb layer 204, about 300-1000 Å for first passivation layer 210, and about 2.0 microns or greater for photoimageable passivation layer 220.

Figure 3:
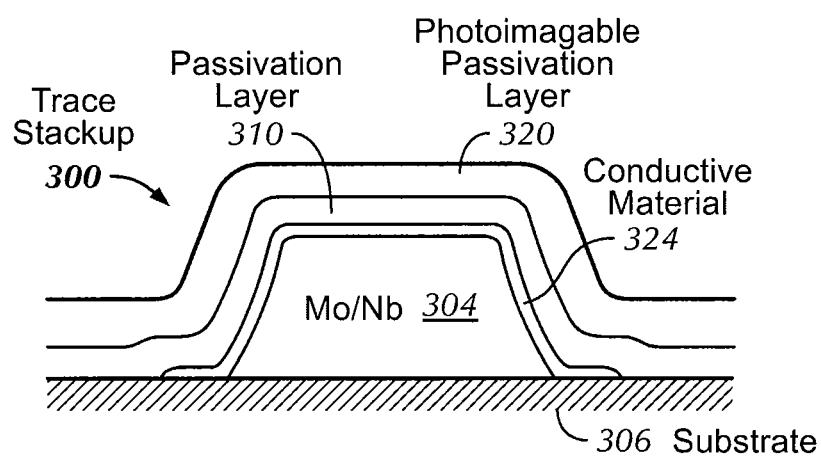
FIG. 3 illustrates yet another improved reliability exemplary conductive trace layer stackup formed on a touch sensor panel according to embodiments of the invention.

FIG. 3 illustrates yet another improved reliability exemplary conductive trace layer stackup 300 formed on a touch sensor panel according to embodiments of the invention. In the example of FIG. 3, as in FIG. 2, a single thicker and wider layer of Mo/Nb 304 having a thickness of about 3000-5000 Å can be formed on substrate 306. After Mo/Nb layer 304 is deposited at the preferred thickness, it can be patterned (etched) to form traces. A layer of conductive material 324 such as ITO can then be formed over Mo/Nb layer 304. Note that one of the purposes of the conductive traces described herein is for coupling to either the drive or sense lines on the touch sensor panel. In the previously described embodiments, the conductive traces are formed on top of the drive or sense lines (not shown in the preceding figures). However, in the embodiment of FIG. 3, to give an extra measure of protection, Mo/Nb layer 304 can be formed and patterned first, followed by conductive material layer 324. Conductive material layer 324 can be patterned to form the drive or sense lines that couple to the metal traces, and can also be patterned over Mo/Nb traces 304 to form another protective layer for the Mo/Nb traces. First passivation layer 310 (e.g. $SiO_2$) and photoimageable passivation layer 320 (e.g. organic polymer) can then be formed over conductive material layer 324. Typical thicknesses for the materials of stackup 300 can be about 3000-5000 Å for Mo/Nb layer 304, about 100-200 Å for conductive material layer 324, about 300-1000 Å for first passivation layer 310, and about 2.0 microns or greater for photoimageable passivation layer 320. Although FIG. 3 illustrates Mo/Nb layer 304 under a layer of conductive material 324 such as ITO, in alternative embodiments, the trace could be formed from conductive material under a layer of Mo/Nb.

Figure 4:
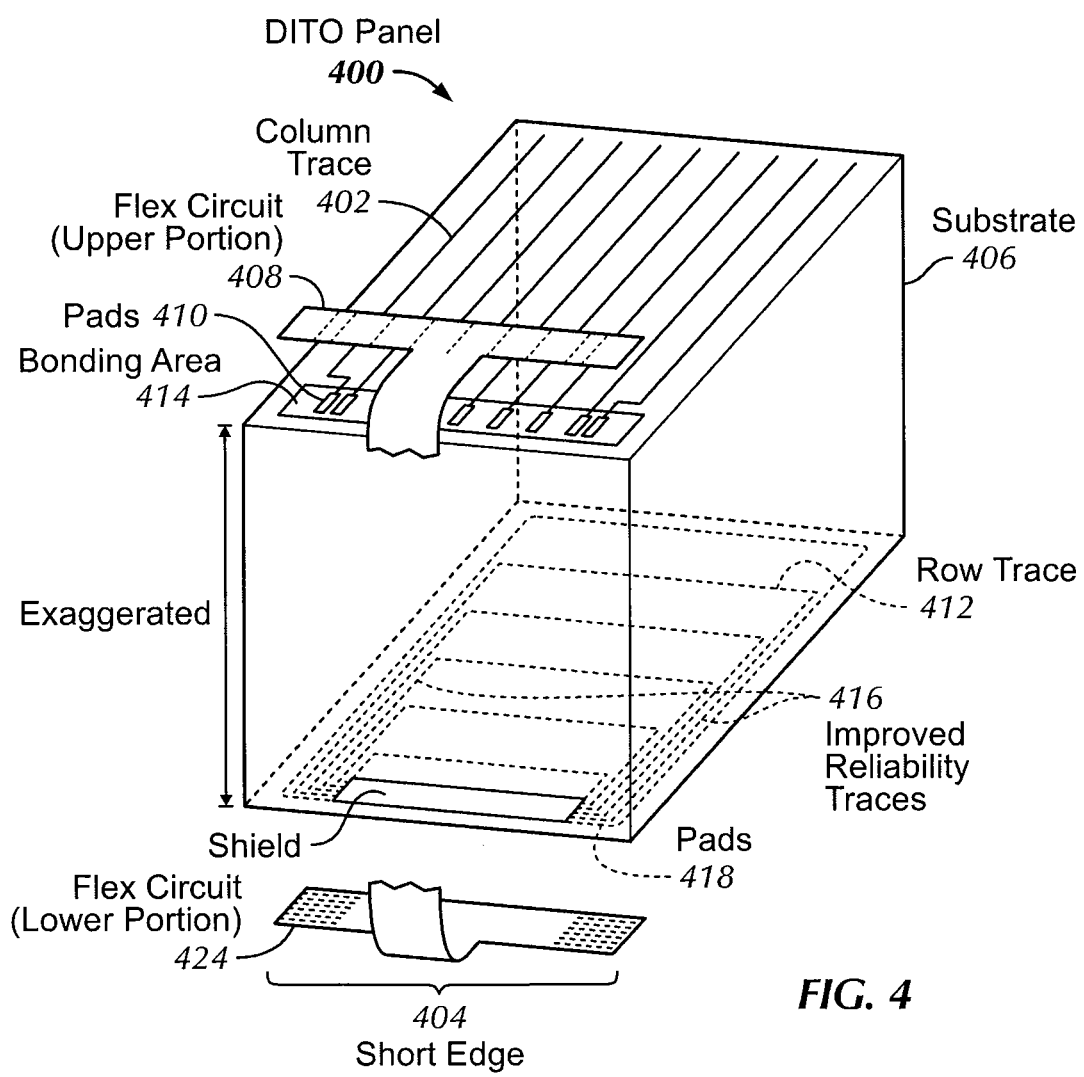
FIG. 4 illustrates an exemplary DITO touch sensor panel having improved reliability conductive traces according to embodiments of the invention.

FIG. 4 illustrates an exemplary DITO touch sensor panel 400 having improved reliability conductive traces 416 according to embodiments of the invention. As shown in FIG. 4 (with the z-direction greatly exaggerated for clarity of illustration), DITO multi-touch sensor panel 400 can have column traces 402 (e.g. sense lines) that can terminate at a short edge 404 of substrate 406, requiring flex circuit 424 having wide flex circuit portion 408 extending the full width of the short edge that can bond to bond pads 410 on the top side of the substrate.

It can be undesirable to have column traces 402 (e.g. sense lines) and row traces 412 (e.g. drive lines) cross over each other at bonding area 414, and it can also be undesirable to have bond pads 410 and 418 formed on directly opposing sides of substrate 406 because such areas can generate unwanted stray mutual capacitance and coupling of signals.

Therefore, row traces 412 can be routed to the same short edge 404 of substrate 406 as column traces 402 using improved reliability conductive traces 416 running along the borders of the substrate.

Figure 5A:
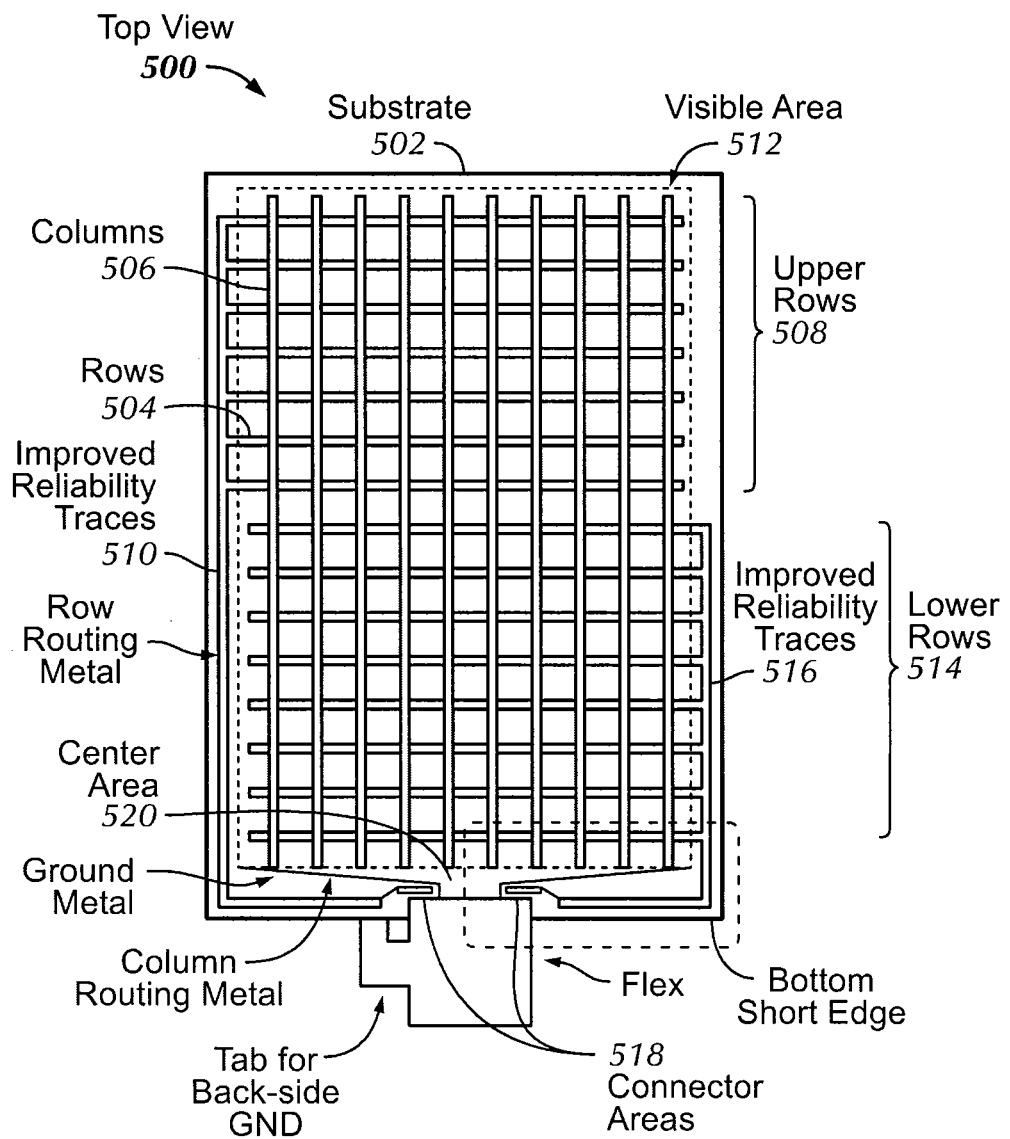
FIG. 5a illustrates a top view of an exemplary touch sensor panel with rows and columns coupled to improved reliability conductive traces according to embodiments of the invention.

FIG. 5a illustrates top view 500 of an exemplary touch sensor panel with rows 504 and columns 506 coupled to improved reliability conductive traces according to embodiments of the invention. In FIG. 5, the grid of rows and columns is symbolic—the rows and columns can be diamond-shaped, rectangular, or any of a number of shapes. Upper rows 508 can be routed to the bottom short edge of substrate 502 using improved reliability conductive traces 510 running along the left border of the substrate, outside visible area 512. Lower rows 514 can be routed to the bottom short edge of substrate 502 using improved reliability conductive traces 516 running along the right border of the substrate, outside visible area 512. By coupling the rows to conductive traces at only one end, the conductive traces can take up less width in the border areas and can be made wider, lowering their resistivity or enabling the use of more environmentally robust but higher resistivity materials. Improved reliability conductive traces 510 and 516 can be coupled to bond pads in small connector areas 518 near the middle of the bottom short edge of substrate 502. The column traces can be routed to center 520 of the small connector area using improved reliability conductive traces.

Figure 5B:
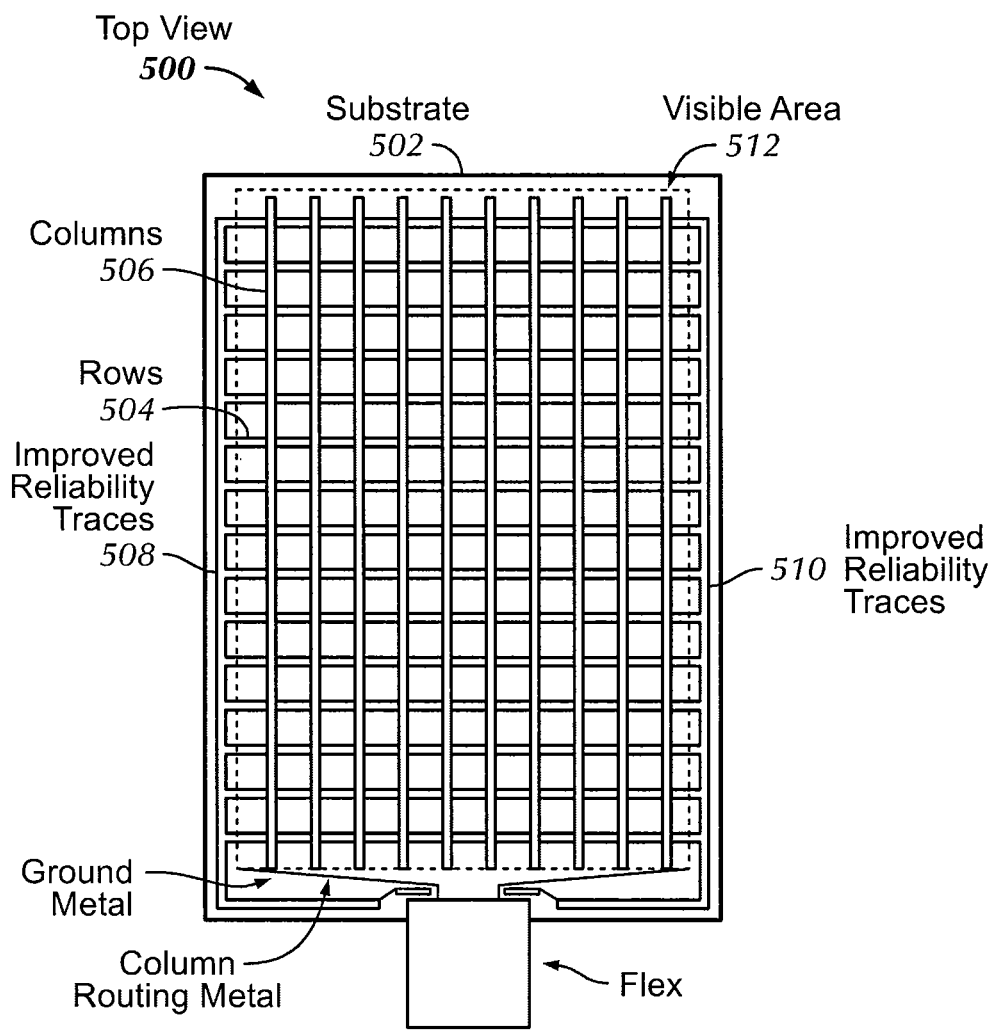
FIG. 5b illustrates a top view of another exemplary touch sensor panel with rows and columns coupled to improved reliability conductive traces according to embodiments of the invention.

FIG. 5b illustrates top view 500 of exemplary substrate 502 with rows 504 and columns 506 coupled to improved reliability conductive traces according to embodiments of the invention. In the example embodiment of FIG. 5b, all rows 504 can be coupled on both the left and right sides to improved reliability conductive traces 508 and 510 running within the left and right borders of substrate 502. Because rows 504 only need to be driven for half of the width of substrate 502, the phase delay differences between rows is reduced. However, one drawback is that because double the number of improved reliability conductive traces can be needed as compared to FIG. 5a, the traces must be made narrow, which increases their resistivity.

Figure 6:
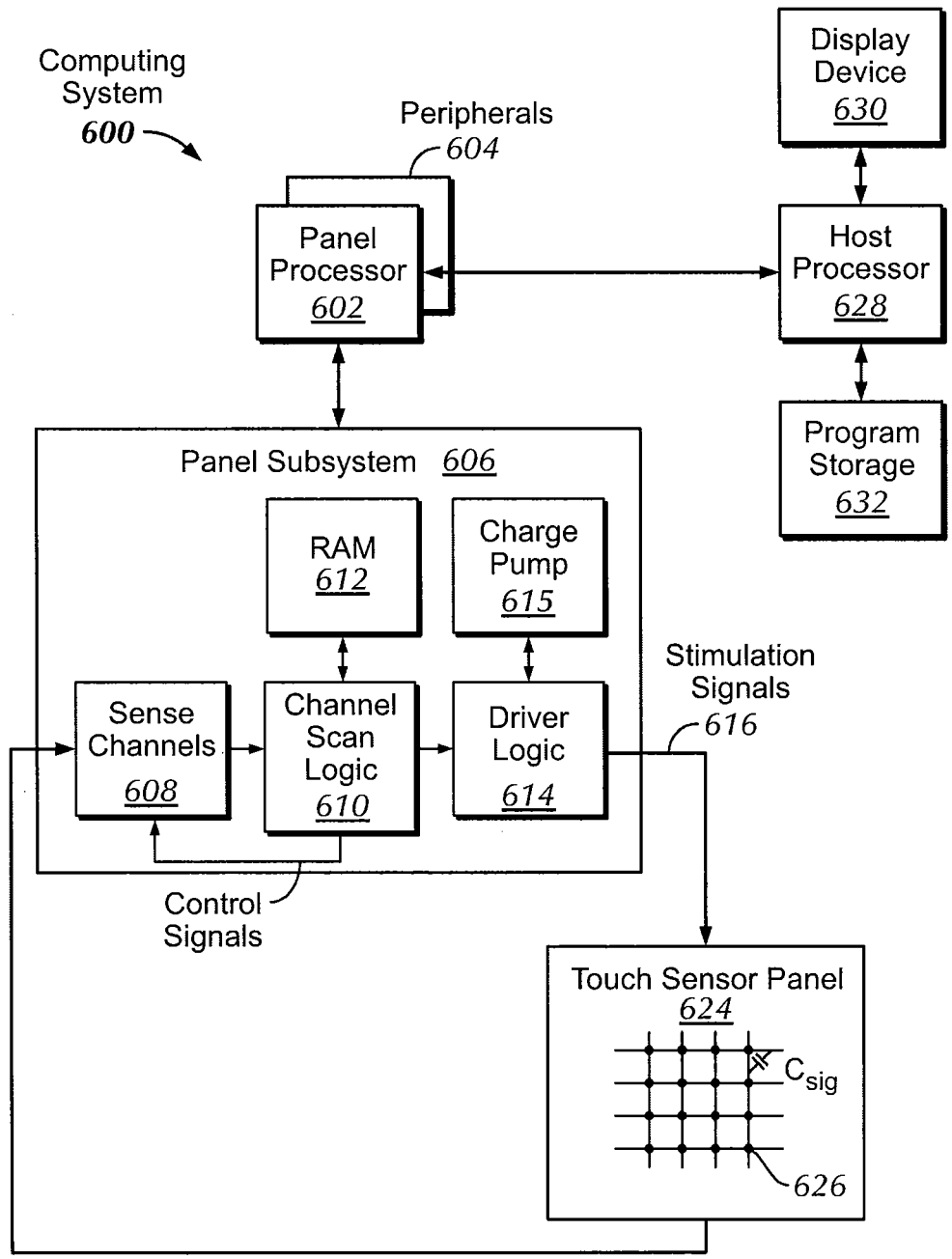
FIG. 6 illustrates an exemplary computing system including a touch sensor panel utilizing improved reliability traces according to embodiments of the invention

FIG. 6 illustrates exemplary computing system 600 that can include one or more of the embodiments of the invention described above. Computing system 600 can include one or more panel processors 602 and peripherals 604, and panel subsystem 606. Peripherals 604 can include, but are not limited to, random access memory (RAM) or other types of memory or storage, watchdog timers and the like. Panel subsystem 606 can include, but is not limited to, one or more sense channels 608, channel scan logic 610 and driver logic 614. Channel scan logic 610 can access RAM 612, autonomously read data from the sense channels and provide control for the sense channels. In addition, channel scan logic 610 can control driver logic 614 to generate stimulation signals 616 at various frequencies and phases that can be selectively applied to drive lines of touch sensor panel 624. In some embodiments, panel subsystem 606, panel processor 602 and peripherals 604 can be integrated into a single application specific integrated circuit (ASIC).

Touch sensor panel 624 can include a capacitive sensing medium having a plurality of drive lines and a plurality of sense lines, although other sensing media can also be used. Either or both of the drive and sense lines can be coupled to improved reliability conductive traces according to embodiments of the invention. Each intersection of drive and sense lines can represent a capacitive sensing node and can be viewed as picture element (pixel) 626, which can be particularly useful when touch sensor panel 624 is viewed as capturing an "image" of touch. (In other words, after panel subsystem 606 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 624 can drive sense channel 608 (also referred to herein as an event detection and demodulation circuit) in panel subsystem 606.

Computing system 600 can also include host processor 628 for receiving outputs from panel processor 602 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 628 can also perform additional functions that may not be related to panel processing, and can be coupled to program storage 632 and display device 630 such as an LCD display for providing a UI to a user of the device. Display device 630 together with touch sensor panel 624, when located partially or entirely under the touch sensor panel, can form touch screen 618.

Note that one or more of the functions described above can be performed by firmware stored in memory (e.g. one of the peripherals 604 in FIG. 6) and executed by panel processor 602, or stored in program storage 632 and executed by host processor 628. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 7A:
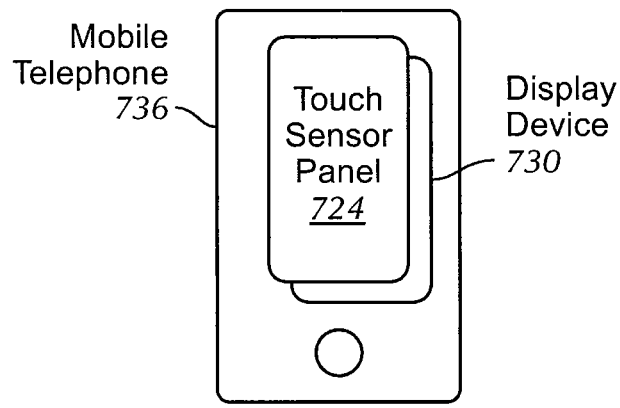
FIG. 7a illustrates an exemplary mobile telephone having a touch sensor panel that includes improved reliability traces according to embodiments of the invention.

FIG. 7a illustrates exemplary mobile telephone 736 that can include touch sensor panel 724 and display device 730, the touch sensor panel including improved reliability conductive traces according to embodiments of the invention.

Figure 7B:
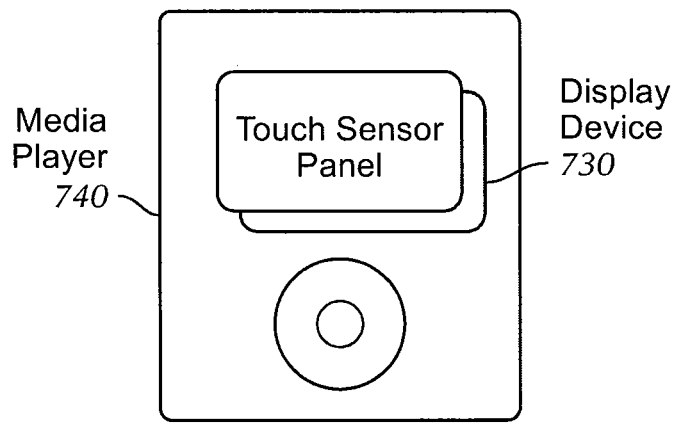
FIG. 7b illustrates an exemplary digital media player having a touch sensor panel that includes improved reliability traces according to embodiments of the invention.

FIG. 7b illustrates exemplary digital media player 740 that can include touch sensor panel 724 and display device 730, the touch sensor panel including improved reliability conductive traces according to embodiments of the invention.

Figure 7C:
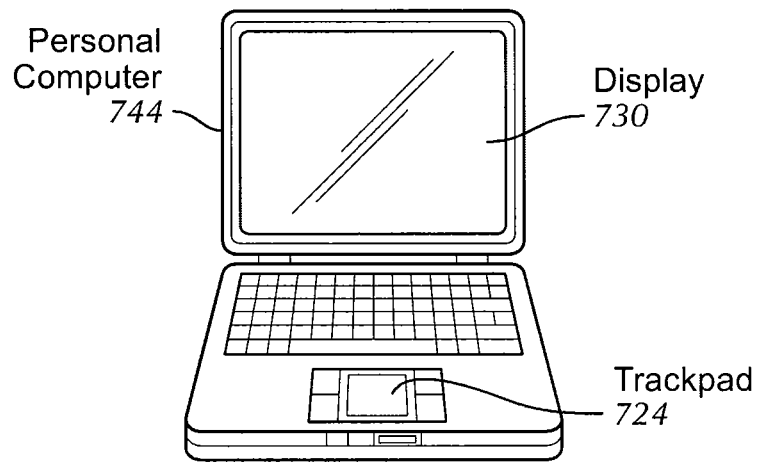
FIG. 7c illustrates an exemplary personal computer having a touch sensor panel (trackpad) and/or display that includes improved reliability traces according to embodiments of the invention.

FIG. 7c illustrates exemplary personal computer 744 that can include touch sensor panel (trackpad) 724 and display 730, the touch sensor panel and/or display of the personal computer (in embodiments where the display is part of a touch screen) including improved reliability conductive traces according to embodiments of the invention. The mobile telephone, media player and personal computer of FIGS. 7a, 7b and 7c can achieve improved overall reliability by utilizing the improved reliability traces according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A touch sensor panel including a viewing area and improved reliability conductive traces for carrying signals on a touch sensor panel, comprising:
   a first layer of Molybdenum Niobium (Mo/Nb) formed on a substrate;
   a second layer of Aluminum Neodymium (Al/Nd) formed on the first layer, the first layer for adhering the second layer to the substrate;
   a third layer of the Molybdenum Niobium (Mo/Nb) formed on the second layer, the third layer for protecting the second layer; and
   an organic polymer photoimageable passivation layer formed on the third layer without overlapping with the viewing area;
   wherein the first, second and third layers are patterned to form the conductive traces and fully sealed over the substrate by only the organic polymer photoimageable passivation layer.

2. The improved reliability conductive traces of claim 1, further comprising a first passivation layer formed between the third layer and the organic polymer photoimageable passivation layer.

3. The improved reliability conductive traces of claim 2, the first passivation layer comprising silicon dioxide (SiO$_2$).

4. The improved reliability conductive traces of claim 1, the first, second and third layers patterned using photolithographic techniques having tolerances of less than +/−10 microns to minimize an overall size of the touch sensor panel.

5. The improved reliability conductive traces of claim 1, the improved reliability conductive traces formed within a touch sensor panel.

6. The improved reliability conductive trace of claim 5, the touch sensor panel incorporated within a computing system.

7. A touch sensor panel including a viewing area and improved reliability conductive traces for carrying signals on a touch sensor panel, comprising:
   a Molybdenum Niobium (Mo/Nb) layer patterned on a substrate to form the conductive traces with controlled wall angles; and
   an organic polymer photoimageable passivation layer formed over the conductive traces without overlapping with the viewing area,
   wherein the Mo/Nb layer is fully sealed over the substrate by only the organic polymer photoimageable passivation layer.

8. The improved reliability conductive traces of claim 7, further comprising a first passivation layer formed between the Mo/Nb layer and the organic photoimageable passivation layer.

9. The improved reliability conductive traces of claim 8, further comprising a conductive layer formed between the Mo/Nb layer and the first passivation layer.

10. The improved reliability conductive traces of claim 9, the conductive layer comprising Indium Tin Oxide (ITO).

11. The improved reliability conductive traces of claim 8, the first passivation layer comprising silicon dioxide (SiO$_2$).

12. The improved reliability conductive traces of claim 7, the organic photoimageable passivation layer patterned using photolithographic techniques having tolerances of less than +/−10 microns to minimize an overall size of the touch sensor panel.

13. The improved reliability conductive traces of claim 7, the improved reliability conductive traces formed within a touch sensor panel.

14. The improved reliability conductive traces of claim 13, the touch sensor panel incorporated within a computing system.

15. A touch sensor panel including a viewing area and improved reliability conductive traces for carrying signals on a touch sensor panel, comprising:
   a first layer of Molybdenum Niobium (Mo/Nb) formed on a substrate;
   a second layer of a second conductive material formed on the first layer, the first and second layers configured as transparent conductive electrodes and border electrical connections; and
   an organic polymer photoimageable passivation layer formed over the first and second layers without overlapping with the viewing area,
   wherein the first and second layers are fully sealed over the substrate by only the organic polymer photoimageable passivation layer.

16. The improved reliability conductive traces of claim 15, the second layer formed from Indium Tin Oxide (ITO).

17. The improved reliability conductive traces of claim 15, further comprising a first passivation layer formed between the second layer and the organic photoimageable passivation layer.

18. The improved reliability conductive traces of claim 17, the first passivation layer comprising silicon dioxide (SiO$_2$).

19. The improved reliability conductive traces of claim 15, the organic photoimageable passivation layer patterned using photolithographic techniques having tolerances of less than +/−10 microns to minimize an overall size of the touch sensor panel.

20. A mobile telephone including a touch sensor panel including a viewing area and containing a plurality of improved reliability conductive traces, the improved reliability conductive traces comprising:
   a first layer of Molybdenum Niobium (Mo/Nb) formed on a substrate;

a second layer of Aluminum Neodymium (Al/Nd) formed on the first layer, the first layer for adhering the second layer to the substrate;

a third layer of Molybdenum Niobium (Mo/Nb) formed on the second layer, the third layer for protecting the second layer; and an organic polymer photoimageable passivation layer formed on the third layer without overlapping with the viewing area;

wherein the first, second and third layers are patterned to form the conductive traces and fully sealed over the substrate by only the organic polymer photoimageable passivation layer.

21. A digital media player including a touch sensor panel including a viewing area and containing a plurality of improved reliability conductive traces, the improved reliability conductive traces comprising:

a Molybdenum Niobium (Mo/Nb) layer with a thickness of between 3000-5000 angstroms formed and patterned on a substrate to form the conductive traces with controlled wall angles; and an organic polymer photoimageable passivation layer with a thickness of at least 2.0 microns formed over the conductive traces without overlapping with the viewing area, wherein the Mo/Nb layer is fully sealed over the substrate by only the organic polymer photoimageable passivation layer.

* * * * *